(12) United States Patent
Uehara et al.

(10) Patent No.: US 8,096,189 B2
(45) Date of Patent: Jan. 17, 2012

(54) PHYSICAL QUANTITY SENSOR AND METHOD FOR MANUFACTURING THE SAME

(75) Inventors: Daiji Uehara, Tokyo (JP); Yoichi Kobayashi, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 304 days.

(21) Appl. No.: 12/419,656

(22) Filed: Apr. 7, 2009

(65) Prior Publication Data
US 2009/0255343 A1    Oct. 15, 2009

(30) Foreign Application Priority Data

Apr. 9, 2008 (JP) .................................. 2008-101393

(51) Int. Cl.
*G01L 9/12* (2006.01)
(52) U.S. Cl. ................... 73/724; 73/715; 361/283.4
(58) Field of Classification Search .................. None
See application file for complete search history.

(56) References Cited

U.S. PATENT DOCUMENTS

| | | | | |
|---|---|---|---|---|
| 4,184,189 A * | 1/1980 | Davis et al. | ........... | 361/283.4 |
| 4,322,775 A * | 3/1982 | Delatorre | ........... | 361/283.4 |
| 4,358,814 A * | 11/1982 | Lee et al. | ........... | 361/283.4 |
| 4,495,820 A * | 1/1985 | Shimada et al. | ........... | 73/724 |
| 4,586,109 A * | 4/1986 | Peters et al. | ........... | 361/283.4 |
| 5,150,275 A * | 9/1992 | Lee et al. | ........... | 361/283.4 |
| 5,155,061 A * | 10/1992 | O'Connor et al. | ........... | 438/53 |
| 5,178,015 A * | 1/1993 | Loeppert et al. | ........... | 73/718 |
| 5,442,962 A * | 8/1995 | Lee | ........... | 73/718 |
| 6,167,761 B1 * | 1/2001 | Hanzawa et al. | ........... | 73/724 |
| 6,205,861 B1 * | 3/2001 | Lee | ........... | 73/724 |
| 6,568,274 B1 * | 5/2003 | Lucas et al. | ........... | 73/718 |
| 7,000,482 B2 * | 2/2006 | Mei | ........... | 73/718 |
| 7,043,994 B2 * | 5/2006 | Mei | ........... | 73/708 |
| 7,395,716 B2 * | 7/2008 | Mei | ........... | 73/724 |
| 7,401,524 B2 * | 7/2008 | Yoshikawa et al. | ........... | 73/718 |

FOREIGN PATENT DOCUMENTS

| | | |
|---|---|---|
| JP | 04-083733 | 3/1992 |
| JP | 10-82709 | 3/1998 |
| JP | 2782546 | 5/1998 |
| JP | 11-248574 | 9/1999 |
| JP | 2000-199727 | 7/2000 |
| JP | 2001-72433 | 3/2001 |
| JP | 2002-296132 | 10/2002 |
| JP | 2006-250837 | 9/2006 |
| JP | 2006-275702 | 10/2006 |

* cited by examiner

*Primary Examiner* — Lisa Caputo
*Assistant Examiner* — Jermaine Jenkins
(74) *Attorney, Agent, or Firm* — Rankin, Hill & Clark LLP

(57) ABSTRACT

A physical quantity sensor includes two substrates and a movable electrode that is disposed between the two substrates and is bonded to the two substrates. In the physical quantity sensor, the movable electrode has an elastically deformable diaphragm and one of the two substrates is an electrode substrate having a detection electrode on a detection surface opposite to the diaphragm to detect capacitance between the diaphragm and the detection electrode. In the physical quantity sensor, in a range between a room temperature and a bonding temperature when the two substrates and the movable electrode are bonded, coefficients of thermal expansion of the two substrates are smaller than that of the movable electrode and in a temperature range where the physical quantity sensor is used, a coefficient of thermal expansion of the movable electrode is between a first and second substrates.

6 Claims, 12 Drawing Sheets

PHYSICAL QUANTITY SENSOR AND METHOD FOR MANUFACTURING THE SAME

BACKGROUND OF THE INVENTION

1. Field of the Invention

The present invention relates to a highly sensitive, small-sized and inexpensive physical quantity sensor for reducing disturbance strain caused by temperature and a method for manufacturing the physical quantity sensor.

2. Description of Related Art

Traditionally, a pressure sensor that detects a pressure according to a change in capacitance between electrodes (for example, see Document 1: JP-A-10-082709) and a pressure sensor that detects a pressure according to a strain (for example, see Document 2: JP-A-2006-250837) are known as a physical quantity sensor.

FIG. 1 is an exploded perspective view of a pressure sensor disclosed in Document 1 and FIG. 2 is a cross section of the pressure sensor taken along II-II line.

As shown in FIGS. 1 and 2, a capacitive pressure sensor 10 includes: a conductive movable electrode 20; a first substrate 30 and a second substrate 40 that are glass substrates bonded to a thick portion 21 surrounding the movable electrode 20; and a pair of detection electrodes 31 provided on the first substrate 30.

In the above pressure sensor 10, the movable electrode 20 provided in a gap between the first substrate 30 and the second substrate 40 is bended by a pressure applied through a pressure inlet 41 provided in the second substrate 40.

Accordingly, capacitance varies between the movable electrode 20 and the pair of detection electrodes 31 provided on the first substrate 30 and the varied capacitance is electrically processed to measure the pressure.

On the other hand, a strain gauge pressure sensor as disclosed in Document 2 includes a semiconductor pressure-detecting element on the movable electrode 20 in place of the detection electrodes 31 and the like in FIGS. 1 and 2, where pressure is measured according to a change in resistance of the semiconductor pressure-detecting element.

In Document 2, the first substrate 30 and the second substrate 40 are prepared by a material having different coefficients of thermal expansion, thereby reducing nonlinear disturbance strain caused by changes in ambient temperature and static pressure.

When the typical pressure sensor 10 as disclosed in Documents 1 and 2 is manufactured, the thick portion 21 surrounding the movable electrode 20 is bonded to the first substrate 30 and the second substrate 40.

A known bonding method such as anodic bonding is used for bonding. In such a bonding, the movable electrode 20, the first substrate 30 and the second substrate 40 are heated to a high temperature (for example, approximately 400 degree C.).

When the pressure sensor 10 heated by the bonding is cooled down to a room temperature, there is a possibility that the movable electrode 20 may be bended due to a difference in the coefficients of thermal expansion between the movable electrode 20 and the first and second substrates 30 and 40.

Moreover, there is a possibility that the movable electrode 20 is drawn toward the first substrate 30 or the second substrate 40 by an electrostatic force and is bonded while the movable electrode 20 is bended.

When the movable electrode 20 is bended, particularly in the capacitive pressure sensor 10 a distance and a capacitance between the movable electrode 20 and the detection electrodes 31 vary to deteriorate temperature characteristics.

Further, there is a possibility that the movable electrode 20 is bonded to the first substrate 30 or the second substrate 40, so that a yield decreases and a manufacturing cost increases.

In the typical pressure sensor 10 as disclosed in Documents 1 and 2, the movable electrode 20 needs to be thinned in order to achieve a high sensitivity.

When the size of the pressure sensor 10 is reduced, the size of the movable electrode 20 is consequently reduced. In such a case, the movable electrode 20 needs to be thinned in order to obtain a sufficient displacement in response to applied pressure with the reduced size.

However, when the movable electrode 20 is thinned, the movable electrode 20 is easily drawn toward to the first substrate 30 or the second substrate 40 by an electrostatic attractive force in anodic bonding. Further, the movable electrode 20 easily receives disturbance strain due to thermal expansion of respective components caused by the change in ambient temperature, resulting in deterioration of temperature characteristics.

Accordingly, the pressure sensor in such a typical structure inherently has a limitation in improvement of sensitivity and reduction in size while maintaining temperature characteristics.

SUMMARY OF THE INVENTION

An object of the present invention is to solve the above problem and provide a highly sensitive, small-sized and inexpensive physical quantity sensor for reducing disturbance strain due to temperature and a method for manufacturing the physical quantity sensor.

A physical quantity sensor according to an aspect of the invention includes: two substrates; and a movable electrode that is disposed between the two substrates and is bonded to the two substrates, in which the movable electrode is provided with an elastically deformable diaphragm; at least one of the two substrates is an electrode substrate having one or more detection electrode on a detection surface opposite to the diaphragm to detect a change in capacitance between the diaphragm and the detection electrode; in a range between a room temperature and a bonding temperature when the two substrates and the movable electrode are bonded, coefficients of thermal expansion of the two substrates are smaller than coefficient of thermal expansion of the movable substrate; and the two substrates are a first substrate and a second substrate having different coefficients of thermal expansion with each other in a temperature range where the physical quantity sensor is used, the coefficient of thermal expansion of the movable electrode being between the coefficients of thermal expansion of the first substrate and the second substrate in a temperature range where the physical quantity sensor is used.

According to the above arrangement of the invention, in a range between a room temperature and a bonding temperature when the two substrates are bonded to the movable electrode, coefficients of thermal expansion of the two substrates are smaller than the coefficient of thermal expansion of the movable electrode. Thus, in manufacturing the physical quantity sensor, the movable electrode shrinks more than the two substrates when the physical quantity sensor heated while bonding the movable electrode and the two substrates is cooled down to a room temperature.

Accordingly, while the physical quantity sensor is cooled down to a room temperature, the movable electrode is drawn outward by the two substrates.

This drawing force (pretension) prevents the diaphragm from bending and reduces disturbance strain due to temperature. Consequently, the diaphragm can be thinned, so that a highly sensitive, small-sized and inexpensive physical quantity sensor can be provided.

Further, in a temperature range where the physical quantity sensor is used, since the coefficient of thermal expansion of the movable electrode is between the coefficients of thermal expansion of the first and second substrates, thermal deformation (thermal expansion or thermal shrinkage) of the movable electrode due to temperature change is always between thermal deformations of the first and second substrates due to temperature change.

Accordingly, when the temperature of the physical quantity is changed, the first substrate and the second substrate provide a force on the movable electrode in directions opposite to each other.

For example, when the physical quantity sensor is heated so that the first substrate thermally expands more than the movable electrode, the first substrate relatively provides a force drawing the movable electrode outward.

On the other hand, when the second substrate thermally expands less than the movable electrode, the second substrate relatively provides a force compressing the movable electrode inward.

Since the drawing force derived from the first substrate and the compressing force derived from the second substrate are offset, disturbance strain of the diaphragm due to change in the ambient temperature can be prevented.

Consequently, the diaphragm can be thinned, so that a highly sensitive, small-sized and inexpensive physical quantity sensor can be provided.

In a physical quantity sensor according to the above aspect of the invention, the movable electrode is provided with two recesses, each of the two recesses being provided on surfaces opposing the two substrates, and the diaphragm is a thin portion located between bottom surfaces of the two recesses, in which one of the two recesses is deeper than the other of the two recesses, and the bottom surface of the one of the two recesses is larger in area than that of the other of the two recesses.

According to such an arrangement, since the deep recess has a larger bottom surface than that of the shallow recess, even if forces different in scale and direction act on the both sides of the movable electrode from the first substrate and the second substrate, a moment derived therefrom is difficult to be transmitted to the diaphragm. Accordingly, a deformation of the diaphragm caused by the moment can be avoided, so that an output error caused by the deformation can be avoided.

A method for manufacturing the physical quantity sensor according to the above aspect of the invention includes anodically bonding the electrode substrates and the movable electrode while the electrical potentials of the detection electrode formed on the electrode substrates and the movable electrode are equalized.

According to the above aspect of the invention, in the bonding process, the electrical potentials of the detection electrode and the movable electrode are equalized, so that electrostatic attractive force is not generated between the detection electrode and the movable electrode, which prevents the diaphragm from being drawn toward the electrode substrate.

Consequently, the bend of the diaphragm is prevented and stable anodic bonding can be carried out. Further, since disturbance strain due to temperature is reduced, the diaphragm can be thinned, so that a highly sensitive, small-sized and inexpensive physical quantity sensor can be provided.

In the method for manufacturing the physical quantity sensor according to the above aspect of the invention, the bonding includes: laminating a substrate wafer in which a plurality of the substrates are integrally formed, and a diaphragm wafer in which a plurality of the movable substrates are integrally formed; applying voltage to a bonding electrode that is formed on the substrate wafer in a predetermined pattern to anodically bond the substrate wafer and the diaphragm wafer with each other; and cutting the substrate wafer and the diaphragm wafer anodically bonded in the voltage-applying along a cutting line, in which at least a part of the bonding electrode is preferably provided along the cutting line.

According to such an arrangement, since the bonding electrodes are provided along the cutting line, a single bonding electrode is shared between two physical quantity sensors next to each other.

Consequently, according to the above arrangement, the number of the bonding electrodes provided on the substrate wafer is reduced, so that anodic bonding can be efficiently carried out.

Incidentally, the substrate wafer in which a plurality of the electrode substrates are integrally formed is generally provided with a leading electrode from the detection electrode, where the leading electrode is preferably disposed so as not to cross the bonding electrode.

According to the above aspect of the invention, in a range between the bonding temperature and the room temperature when the two substrates and the movable electrode are bonded, since coefficients of thermal expansion of the two substrates are smaller than the coefficient of thermal expansion of the movable electrode, the bend of the diaphragm can be prevented by pretension applied on the movable electrode and disturbance strain due to temperature can be reduced.

Further, since the coefficient of thermal expansion of the movable electrode is between the coefficients of thermal expansion of the first substrate and the second substrate in a temperature range where the physical quantity sensor is used, when the temperature of the physical quantity is changed, forces acting on the movable electrode derived from the first substrate and the second substrate are offset to avoid disturbance strain of the diaphragm caused by changes in ambient temperature.

DETAILED DESCRIPTION OF PREFERRED EMBODIMENT(S)

Exemplary embodiment(s) of the invention will be described below with reference to the attached drawings.
[Arrangement of Pressure Sensor]

Figure 1:
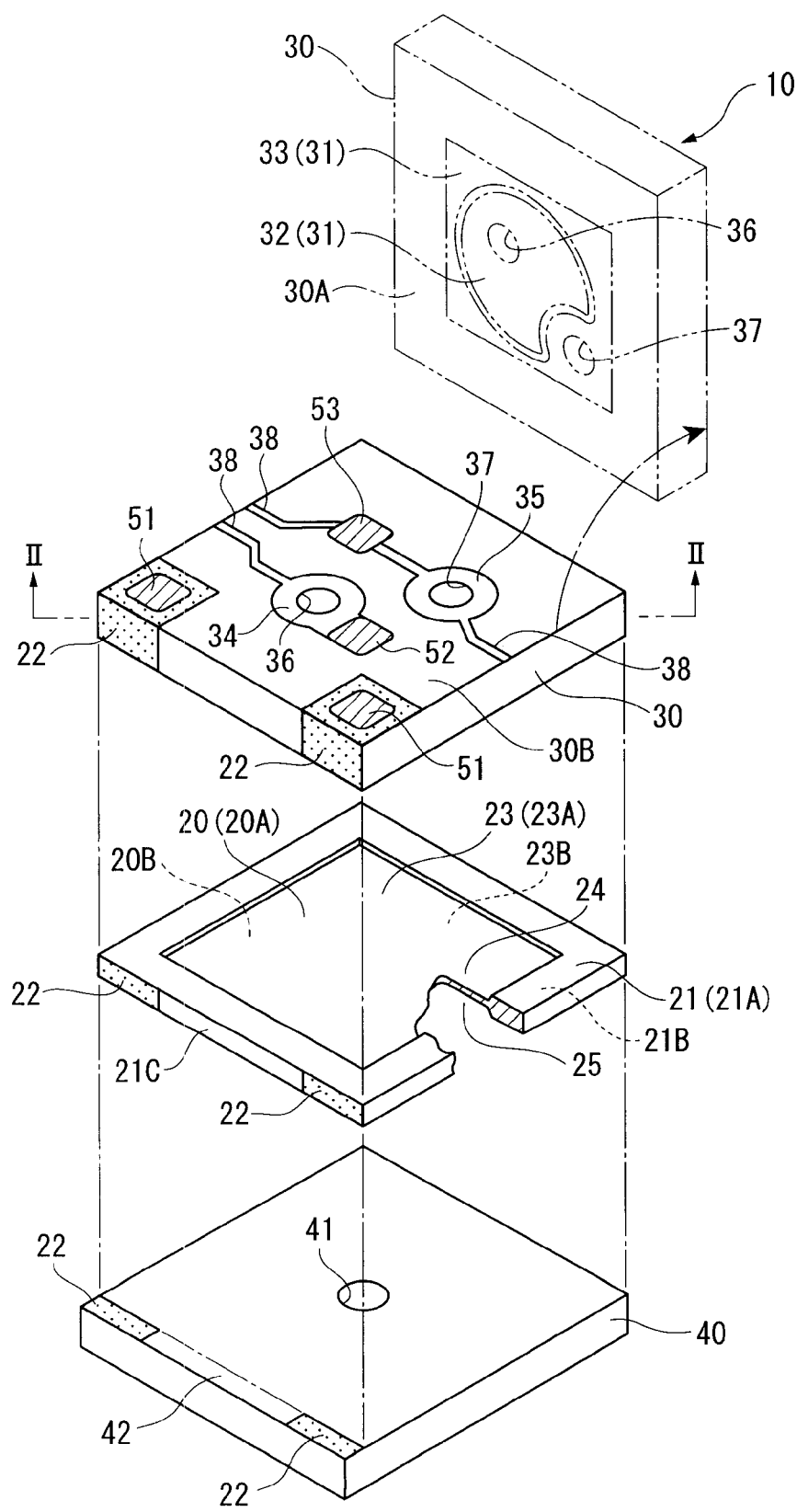
FIG. 1 is an exploded perspective of a pressure sensor according to an exemplary embodiment of the invention.
Figure 2:
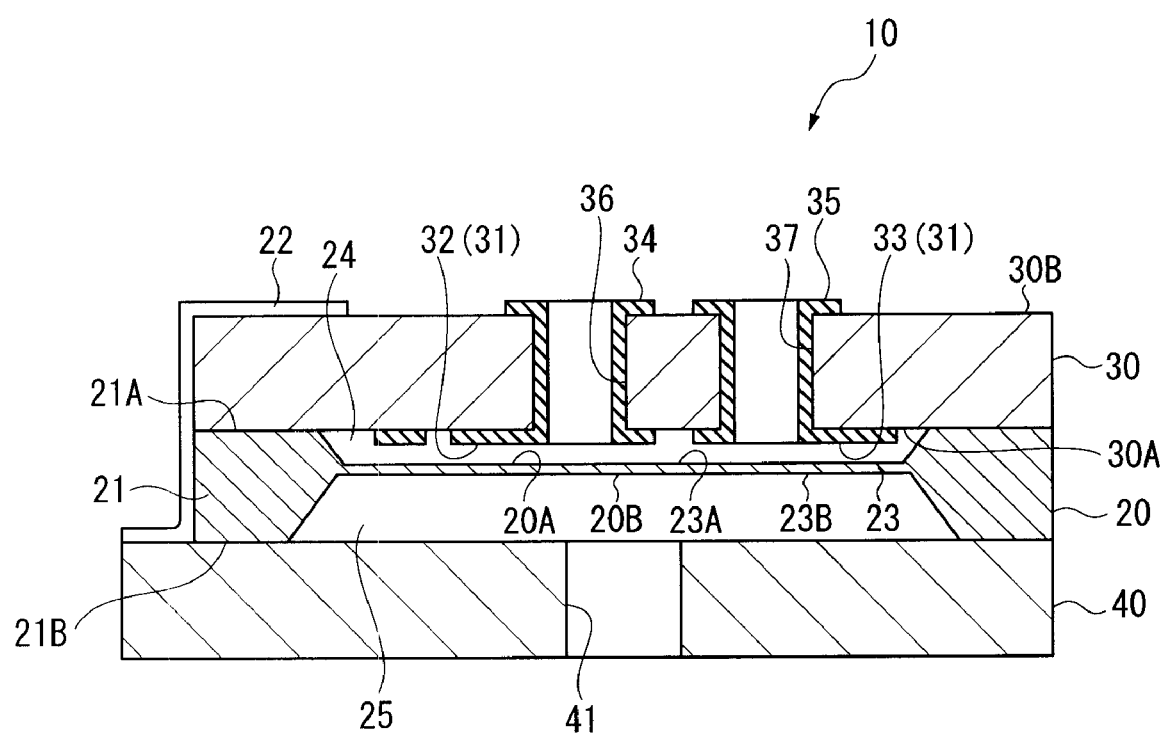
FIG. 2 is a cross section of the pressure sensor of the above exemplary embodiment.

Since a physical quantity sensor of the invention is a pressure sensor and is the same as a typical pressure sensor except for coefficients of thermal expansion of parts, the physical quantity sensor is described using the above FIGS. 1 and 2.

FIG. 1 is an exploded perspective of a pressure sensor 10 according to an exemplary embodiment of the invention. FIG. 2 is a cross section of the pressure sensor 10 taken along II-II line.

The pressure sensor 10 according to this exemplary embodiment is a capacitive pressure sensor that detects the change in a pressure as the change in capacitance.

As shown in FIGS. 1 and 2, the pressure sensor 10 includes: a first substrate 30; a second substrate 40; and a movable electrode 20 provided between two substrates 30 and 40 and bonded thereto.

The movable electrode 20 includes: recesses 24 and 25 respectively formed on surfaces opposite to the first substrate 30 and the second substrate 40; a thin and elastically deformable diaphragm 23 formed between bottom surfaces of the two recesses 24 and 25; and a thick portion 21 formed surrounding the diaphragm 23.

Additionally, the movable electrode 20 is provided with a surface 20A opposing the first substrate 30 and a surface opposite to the surface 20A, i.e. a surface 20B opposite to the second substrate 40. As shown in FIG. 1, an upper surface 23A of the diaphragm 23 provided on the surface 20A is recessed in one step from an upper surface 21A of the thick portion 21 and a lower surface 23B of the diaphragm 23 of the surface 20B is recessed (higher in FIG. 1) from a lower surface 21B of the thick portion 21.

Accordingly, gaps are provided between the diaphragm 23 and the first and second substrates 30 and 40, so that the diaphragm 23 is elastically deformable relative to the first substrate 30.

The movable electrode 20 according to such an arrangement is formed by conductive silicon, which is single-crystal silicon, for example.

As shown in FIG. 2, the recess 25 is deeper than the recess 24. Further, the bottom surface of the recess 25 is larger in area than the bottom surface of the recess 24.

As shown in FIG. 1, the first substrate 30 includes: a detecting surface 30A opposing the movable electrode 20; and an upper surface 30B opposite to the detecting surface 30A.

The first substrate 30 (an electrode substrate) includes: a detection electrode 31 provided on the detecting surface 30A; and a first signal receiving portion 22 and second signal receiving portions 34 and 35 provided on the upper surface 30B.

The second signal receiving portions 34 and 35 are electrically conducted via through-holes 36 and 37 to the detection electrode 31 as shown in FIGS. 1 and 2.

The first substrate 30 has a smaller coefficient of thermal expansion than that of the movable electrode 20 in a range between a bonding temperature and a room temperature when the first substrate 30 is bonded to the movable electrode 20. Moreover, the first substrate 30 has a smaller coefficient of thermal expansion than that of the movable electrode 20 in the range of temperature in which the pressure sensor 10 is used (for example, from −20 degree C. to 100 degree C.).

The first substrate 30 according to such an arrangement is formed of an aluminosilicate glass and the like, for example.

As an aluminosilicate glass, a glass disclosed in JP-A-04-083733 and JP-A-2001-072433 can be used.

Such a glass includes: a glass that contains 50 mass % or more and 70 mass % or less of $SiO_2$, 14 mass % or more and 28 mass % or less of $Al_2O_3$, 1 mass % or more and 5 mass % or less of $Na_2O$, 1 mass % or more and 13 mass % or less of MgO, the total amount of the above components being 80 mass % or more; and a glass that does not substantially contain $Na_2O$ but contains 4-8% of $Li_2O$ (mol %).

Specifically, "SD2 (product name)" manufactured by HOYA CANDEO OPTRONICS CORPORATION and "SW-Y (product name)" manufactured by AGC TECHNO GLASS Co., Ltd. are exemplified.

The detection electrode 31 is formed of a conductive metal such as titanium. As shown in FIG. 1, the detection electrode 31 includes: a central electrode 32 provided substantially at the center of the detecting surface 30A; and a peripheral electrode 33 surrounding the central electrode 32.

The second signal receiving portions 34 and 35 are formed of a conductive metal such as titanium in the same manner as the detection electrode 31. The second signal receiving portion 34 conducted with the central electrode 32 and the second signal receiving portion 35 conducted with the peripheral electrode 33 are provided with leading portions 38 drawn out to both opposing edges of the first substrate 30.

The gap between the diaphragm 23 of the movable electrode 20 and the first substrate 30 is opened to the atmosphere via respective through-holes 36 and 37.

As shown in FIGS. 1 and 2, the second substrate 40 is provided with a pressure inlet 41 substantially at the center thereof. The pressure inlet 41 introduces pressure to the lower surface 23B of the diaphragm 23.

Further, one side surface of the second substrate 40 is extended beyond side surfaces of the movable electrode 20 and the first substrate 30 to provide an extension 42.

The second substrate 40 has a smaller coefficient of thermal expansion than that of the movable electrode 20 in a range between a bonding temperature and a room temperature when the second substrate 40 is bonded to the movable electrode 20. Moreover, the second substrate 40 has a larger coefficient of thermal expansion than that of the movable electrode 20 in the range of temperature in which the pressure sensor 10 is used.

The second substrate 40 according to such an arrangement is formed of, for example, a borosilicate glass (PYREX (trade mark) by Corning Inc., TEMPAX Float (trade mark) by SCHOTT AG and the like) and the like.

As shown in FIGS. 1 and 2, the first signal receiving portion 22 described above is provided from a surface adjacent to the first substrate 30 of the extension 42 to two corners adjacent to the extension 42 of the upper surface 30B of the first substrate 30. According to this arrangement, the first signal receiving portion 22 is conducted with a side surface 21C facing the extension 42 of the thick portion 21 of the movable electrode 20.

A wire bonding pad 51 for bonding a wire (not shown) is provided in the first signal receiving portion 22 on the upper surface 30B of the first substrate 30. Further, the second signal receiving portions 34 and 35 are respectively provided with wire bonding pads 52 and 53.

The first signal receiving portion 22, the second signal receiving portions 34 and 35 and a predetermined portion of a signal processing circuit (not shown) are conducted with each other via the wire bonding pads 51, 52 and 53.

[Operation of Pressure Sensor]

Operation of the pressure sensor 10 will be described below with reference to FIGS. 1 and 2.

In the pressure sensor 10, when a measuring pressure is introduced to the pressure inlet 41, the diaphragm 23 is elastically deformed in a curve to change a distance between the diaphragm 23 and the detection electrode 31, so that the capacitance varies in inverse proportion to the distance.

At this time, the signal processing circuit and the like that are conducted with the diaphragm 23 and the detection electrode 31 through the first signal receiving portion 22, the second signal receiving portions 34 and 35 and the wire bonding pads 51, 52 and 53 detect and process the capacitance between the diaphragm 23 and the detection electrode 31 to measure a pressure.

Since a displacement of the diaphragm 23 in response to the pressure is large around the center and small on the periphery, the change in capacitance between the diaphragm 23 and the central electrode 32 is large and the change in capacitance between the diaphragm 23 and the peripheral electrode 33 is small.

By measuring a difference in the change in the capacitance between the both, an electrical signal in response to pressure can be received. Further, by calculating with the use of the change in the capacitance between the both (for example, a difference of the change in the capacitance/a sum of the change in the capacitance), error effect caused by hygrothermal change and electrical noise can be reduced to allow more accurate pressure detection.

Incidentally, though the pressure sensor 10 is a so-called gauge pressure (a difference in pressure relative to atmospheric pressure to be used as a standard) sensor since the upper surface 23A of the diaphragm 23 is opened to the atmosphere via the through-holes 36 and 37, the pressure sensor 10 may be an absolute pressure sensor in which the gap between the diaphragm 23 and the first substrate 30 is vacuum with the through-holes 36 and 37 being closed.

[Method for Manufacturing Pressure Sensor]

Next, a method for manufacturing the pressure sensor 10 is described below.

A method for manufacturing a pressure sensor according to the exemplary embodiment of the invention includes bonding process in which the electrode substrate and the movable electrode 20 are anodically bonded while the electrical potentials of the detection electrode 31 (see FIGS. 1 and 2, but not shown in FIGS. 3A and 3B) formed on the electrode substrate (the first substrate 30) and the movable electrode 20 are equalized.

The bonding process includes: laminating step; voltage-applying step; circuit-forming step; and cutting step.

Figure 3A:
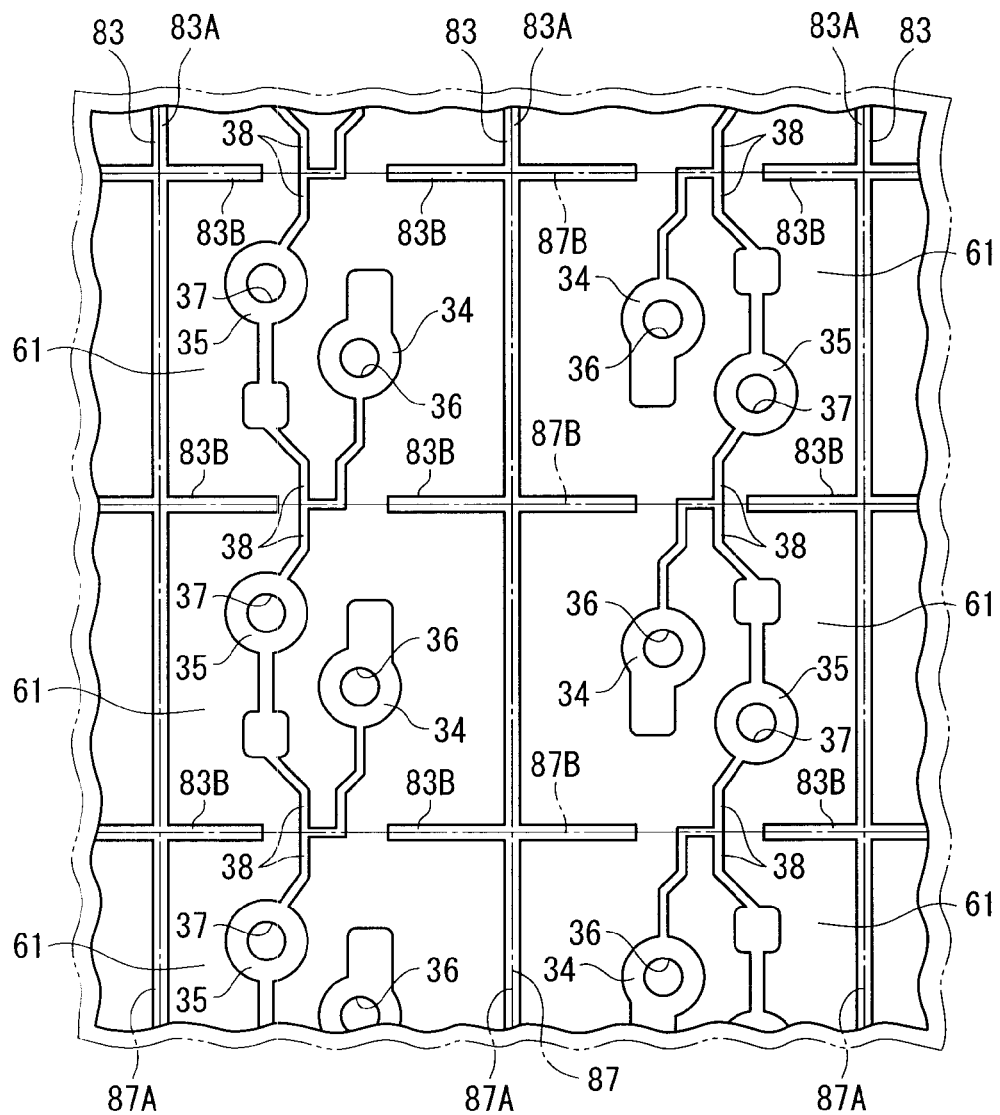
FIG. 3A is a plan view of anodic bonding between a first and a second substrates and a movable electrode of the above exemplary embodiment.
Figure 3B:
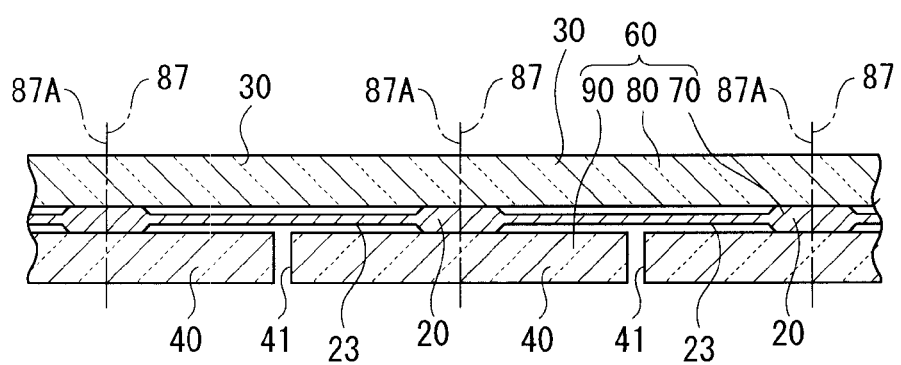
FIG. 3B is a cross section of anodic bonding between the first and the second substrates and the movable electrode of the above exemplary embodiment.

FIGS. 3A and 3B are respectively a plan view and a cross section of the first substrate 30, the second substrate 40 and the movable electrode 20 provided as a wafer before the anodic bonding.

As shown in FIGS. 3A and 3B, in the bonding process, a first substrate wafer 80 in which a plurality of the first substrates 30 are integrally formed, a diaphragm wafer 70 in which a plurality of the movable electrodes 20 are integrally formed, and a second substrate wafer 90 in which a plurality of the second substrates 40 are integrally formed are superposed and anodically bonded before being cut.

An arrangement of the wafers and respective steps will be described below in detail.

[Arrangement of Wafers]

The diaphragm wafer 70 is obtained by processing a silicon wafer by etching and the like and locating a plurality of diaphragms 23 at a predetermined interval (see FIG. 3B).

The first substrate wafer 80 is a glass wafer provided with a plurality of through-holes 36 and 37 at a predetermined interval and the central electrode 32, the peripheral electrode 33, the second signal receiving portions 34 and 35 and a bonding electrode 83 that are formed by vapor-deposition of metal such as titanium, etching and the like (see FIG. 3A, where the central electrode 32 and the peripheral electrode 33 are not shown. In FIG. 3B, the central electrode 32, the peripheral electrode 33, the second signal receiving portions 34 and 35 and the bonding electrode 83 are not shown).

As shown in FIG. 3A, the leading portions 38 of the second signal receiving portions 34 and 35 are respectively formed in a continuous manner in one direction on the first substrate wafer 80.

Moreover, the bonding electrode 83 is formed in a lattice so as not to cross the leading portion 38.

The bonding electrode 83 includes: a trunk-line electrode 83A that extends along the leading portion 38; and branch-line electrodes 83B that extends perpendicularly to the trunk-line electrode 83A.

A cutting line 87 is provided at a position to cut the laminated wafer 60 in the cutting step described below. The cutting line 87 includes: a cutting line 87A that extends along the trunk-line electrode 83A; and a cutting line 87B that is perpendicular to the cutting line 87A and extends along the branch-line electrode 83B.

As shown in FIGS. 3A and 3B, the bonding electrode 83 is provided along the cutting line 87 (87A and 87B).

The second substrate wafer 90 is a glass wafer in which a plurality of pressure inlets 41 are provided at a predetermined interval (see FIG. 3B).

The diaphragm 23 of the diaphragm wafer 70, the first substrate 30 of the first substrate wafer 80, and the second substrate 40 of the second substrate wafer 90 are respectively located at a position corresponding to each other to constitute a sensor chip 61 of the pressure sensor 10 when wafers 70, 80 and 90 are laminated.

[Laminating Step]

Figure 4:
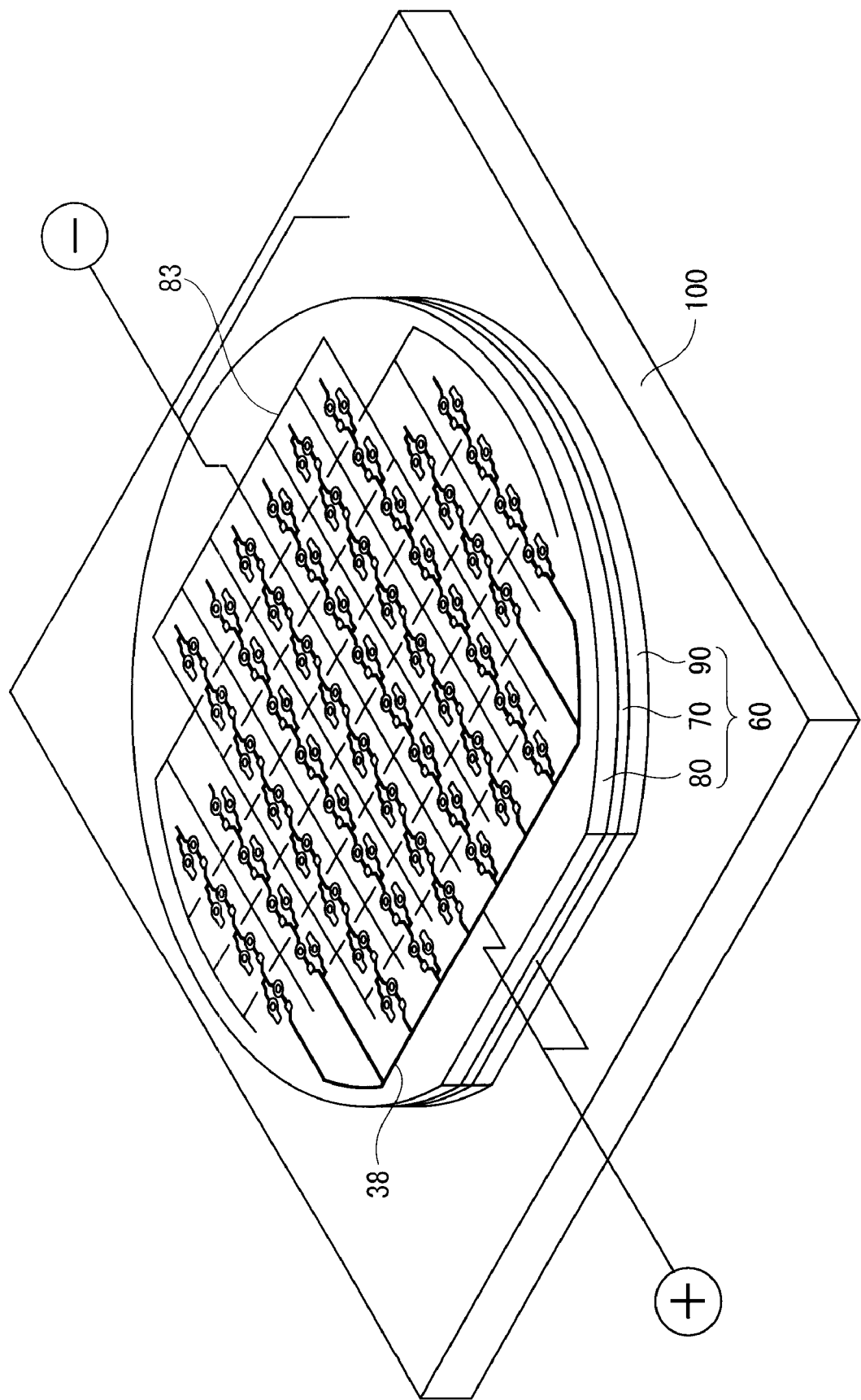
FIG. 4 is a schematic view of a laminated wafer in a laminating step and a voltage-applying step in the above exemplary embodiment.

FIG. 4 is a schematic view of respective wafers 70, 80 and 90 in the laminating step and the voltage-applying step.

In the laminating step, the first substrate wafer 80, the diaphragm wafer 70 and the second substrate wafer 90 are superposed. In particular, as shown in FIG. 4, respective wafers 70, 80 and 90 are sequentially superposed on a conductive platform 100 used for anodic bonding.

[Voltage-Applying Step]

In the voltage applying step, voltage is applied to the bonding electrode 83 of the first substrate wafer 80, followed by anodic bonding of respective wafers 70, 80 and 90.

In particular, high voltage is applied at a high temperature (for example, 300-450 degree C., and 300-1000V) so that the diaphragm wafer 70 and the leading portion 38 are positive and the bonding electrode 83 and the platform 100 are negative, resulting in anodically bonding the respective wafers 70, 80 and 90. Thus, a laminated wafer 60 is formed.

At this time, since the leading portion 38 is connected with the second signal receiving portions 34 and 35, the electrical potentials of the movable electrode 20 and the detection electrode 31 are equalized (see FIGS. 1 and 2). Accordingly, an electrostatic attractive force is not generated between the movable electrode 20 and the detection electrode 31, which prevents the diaphragm 23 from being drawn toward the electrode substrate (the first substrate 30), so that anodic bonding can be properly conducted.

[Circuit-Forming Step]

In this exemplary embodiment, after the voltage-applying step and before the cutting step, the circuit forming step is carried out in which the first signal receiving portion 22 and wire bonding pads 51, 52 and 53 are formed.

Figure 5:
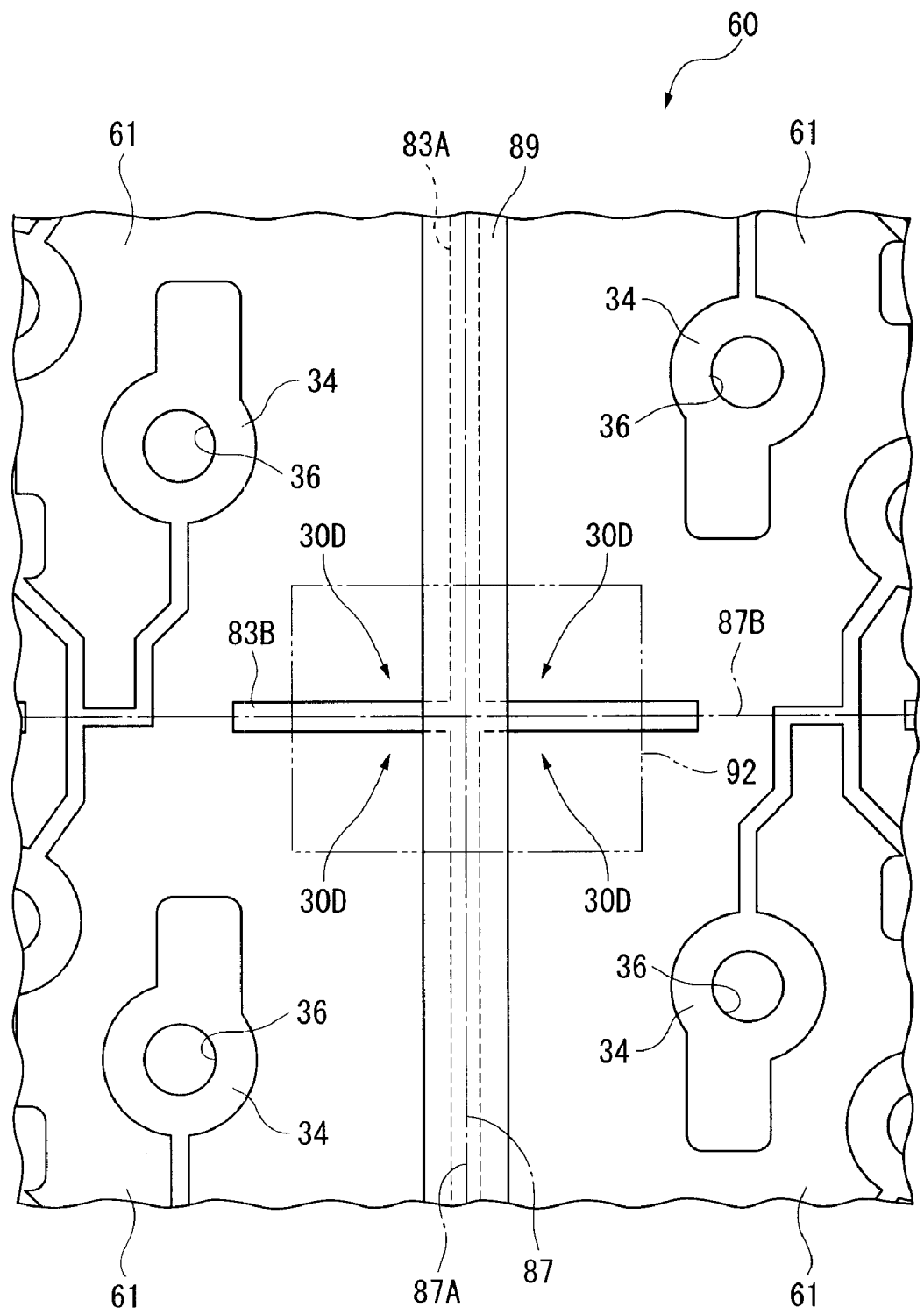
FIG. 5 is a plan view of a laminated wafer in a forming-circuit step and a cutting step in the above exemplary embodiment.
Figure 6:
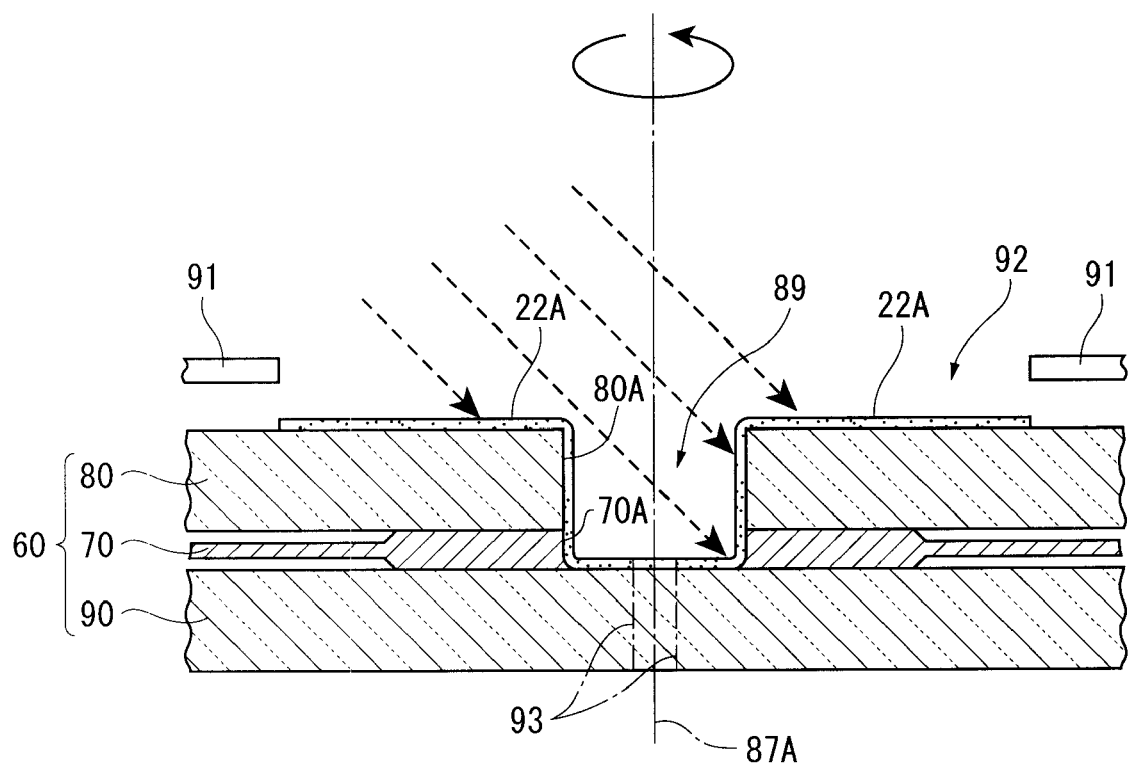
FIG. 6 is a cross section of a laminated wafer in the forming circuit step and the cutting step in the above exemplary embodiment.

FIG. 5 is a plan view of the laminated wafer 60 in the circuit-forming step and the cutting step and FIG. 6 is a cross section thereof.

After the voltage applying step, first, the laminated wafer 60 is removed from the platform 100.

Next, by using a cutting blade having a predetermined blade width that is larger than the width of the trunk-line electrode 83A of the bonding electrode 83, a groove is provided along the cutting line 87A between the second signal receiving portions 34 adjacent to each other. Thus, the trunk-line electrode 83A (a dotted line in FIG. 5) is cut away to form a groove 89.

As shown in FIG. 6, inside of the groove 89, cut surfaces 70A and 80A of the diaphragm wafer 70 and the first substrate wafer 80 are respectively exposed.

Then, the laminated wafer 60 is located in a vapor deposition instrument that is not shown.

At this time, as shown with a chain double-dashed line in FIG. 5, a metal mask 91 having a mask opening 92 that is substantially rectangular is disposed in a manner that a crossing part of the respective cutting lines 87A and 87B of the first substrate wafer 80, that is, a part corresponding to a corner 30D of the sensor chip 61 is exposed (see FIG. 6).

A conductive vapor depositing material such as titanium is fed to the mask opening 92, for example, from a direction of 45 degree from above (see dotted arrows in FIG. 6).

Thus, a vapor deposited layer 22A is formed on a bottom surface and both side surfaces of the groove 89, i.e. cut surfaces 70A of the diaphragm wafer 70 and cut surfaces 80A of the first substrate wafer 80, and at the corners 30D of the sensor chips 61.

When vapor deposition is carried out, it is preferable that the laminated wafer 60 is rotated around a vertical axis.

Next, though not shown, by using a metal mask having a mask opening that is positioned correspondingly to the wire bonding pads 51, 52 and 53, the wire bonding pads 51, 52 and 53 are formed as a conductive vapor deposited layer such as gold in the same procedure as the above.

[Cutting Step]

In the cutting step, the laminated wafer 60 is cut along the latticed cutting lines 87 (87A and 87B) to obtain a plurality of sensor chips 61.

Specifically, a cutting blade that has a smaller width than the cutting blade for providing the groove 89 and has a broader width than the bonding electrode 83 (for example, a cutting blade having a width corresponding to a cutting margin 93 shown in chain line in FIG. 6) is used to cut the vapor deposited layer 22A and the second substrate wafer 90 along the cutting line 87A (main cutting).

Further, by using the same cutting blade, the laminated wafer 60 is cut along the other cutting lines 87A and 87B.

Thus, the vapor deposited layer 22A is divided into four parts and the first signal receiving portion 22 that is conducted with the movable electrode 20 is formed, so that the pressure sensor 10 is taken out from the laminated wafer 60 as the sensor chip 61.

By this cutting, the branch-line electrode 83B of the bonding electrode 83 is completely removed. Moreover, since a part of the leading portion 38 that is formed on an extension of the branch-line electrode 83B is also removed, the signal receiving portions 34 and 35 connected to the leading portion 38 are electrically isolated to provide a final product (the pressure sensor 10).

[Advantage of Embodiment(s)]

Figure 7A:
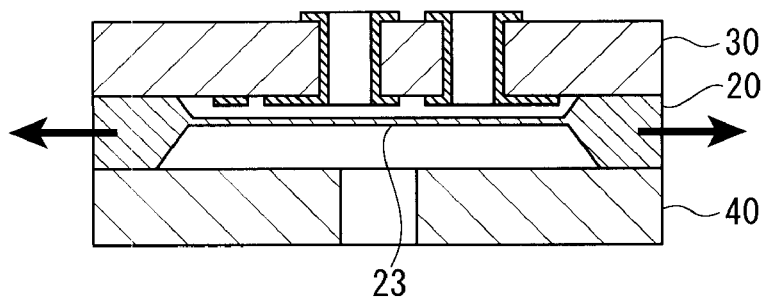
FIG. 7A is a cross section of the pressure sensor of the above exemplary embodiment.
Figure 7B:
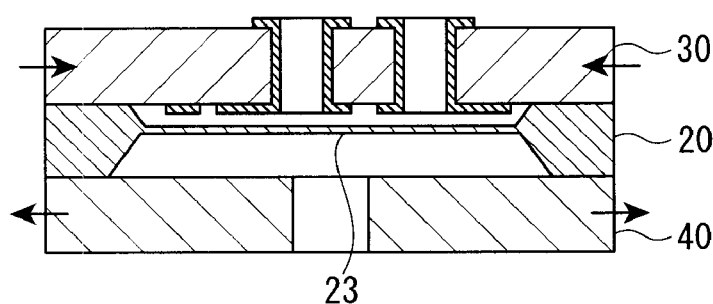
FIG. 7B is a cross section of the pressure sensor of the above exemplary embodiment.
Figure 7C:
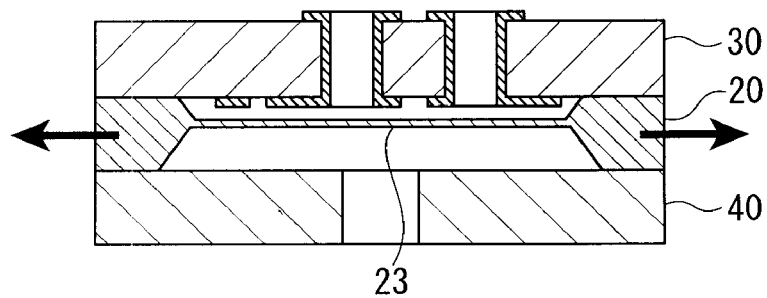
FIG. 7C is a cross section of the pressure sensor of the above exemplary embodiment.

Advantage of the exemplary embodiment of the invention will be described below with reference to FIGS. 7A-7C showing cross sections of the pressure sensor 10 of the exemplary embodiment of the invention.

In the pressure sensor 10 of the above exemplary embodiment, the coefficients of thermal expansion of the two substrates 30 and 40 in the range between the bonding temperature and the room temperature are smaller than the coefficient of thermal expansion of the movable electrode 20.

According to the above arrangement, in manufacturing the pressure sensor 10, the movable electrode 20 shrinks more than the two substrates 30 and 40 when the pressure sensor 10 heated by bonding the movable electrode 20 and the two substrates 30 and 40 is cooled down to room temperature.

Accordingly, in a state that the pressure sensor 10 is cooled down to room temperature, the movable electrode 20 is drawn outward by the two substrates as shown in FIG. 7A.

This drawing force (pretension) prevents the diaphragm 23 from bending and reduces disturbance strain due to temperature. Consequently, the diaphragm 23 is thinned, so that a highly sensitive, small-sized and inexpensive pressure sensor 10 can be provided.

In the pressure sensor 10 according to the above exemplary embodiment, in the temperature range in which the pressure sensor 10 is used, since the coefficient of thermal expansion of the movable electrode 20 is between the coefficients of thermal expansion of the first and second substrates 30 and 40, thermal deformation (thermal expansion or thermal shrinkage) of the movable electrode 20 due to temperature change is always between thermal deformation of the first substrate 30 due to temperature change and thermal deformation of the second substrate 40 due to temperature change.

Accordingly, when the temperature of the pressure sensor 10 is changed, the first substrate 30 and the second substrate 40 provide a force to the movable electrode 20 in directions opposite to each other.

For example, FIG. 7B shows a force that acts on the movable electrode 20 from the first substrate 30 and the second substrate 40 when the pressure sensor 10 is heated.

In FIG. 7B, the first substrate 30 having the smaller coefficient of thermal expansion than the movable electrode 20 thermally expands less than the movable electrode 20. Consequently, the first substrate 30 relatively provides a force compressing the movable electrode 20 inwardly.

On the other hand, the second substrate 40 having the larger coefficient of thermal expansion than that of the movable electrode 20 thermally expands more than the movable electrode 20. Consequently, the second substrate 40 relatively provides a force drawing the movable electrode 20 outward.

Since the compressing force derived from the first substrate 30 and the drawing force derived from the second substrate 40 are offset, the pretension on the movable electrode 20 is maintained to avoid disturbance strain of the diaphragm 23 caused by changes in ambient temperature.

According to this exemplary embodiment, the movable electrode 20 is provided with two recesses 24 and 25 having different depths, the deep recess 25 having a larger bottom surface than that of the shallow recess 24. Accordingly, even if different forces in scale and direction act on the both sides of the movable electrode 20 from the first substrate 30 and the second substrate 40, a moment generated therefrom is difficult to be transmitted to the diaphragm 23.

This will be described below with reference to FIG. 8A to 8C.

Figure 8A:
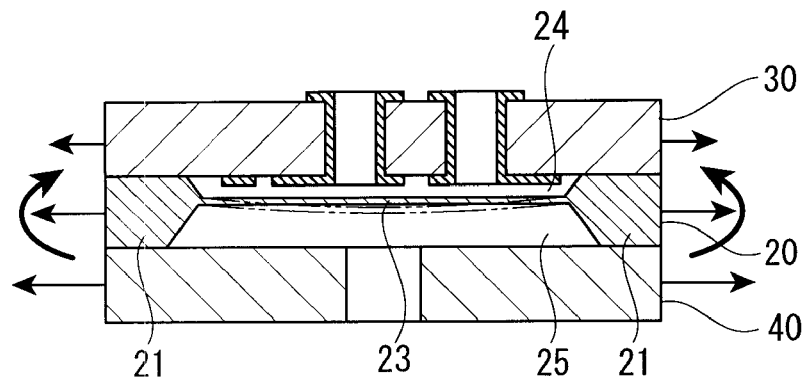
FIG. 8A is an illustration showing how a diaphragm is deformed by a moment.

FIG. 8A is a cross section of the pressure sensor 10 in which the bottom surface of the recesses 24 and 25 are the same in area.

The first substrate 30 and the second substrate 40 are provided with the same characteristics as the above exemplary embodiment. Specifically, the first substrate 30 has a smaller coefficient of thermal expansion and the second substrate 40 has a larger coefficient of thermal expansion than that of the movable electrode 20 in a temperature range where the physical quantity sensor 10 is used.

In FIG. 8A, a dotted line shows a deformation of the diaphragm 23 when a temperature changes by +ΔT degree C.

When a temperature changes by +ΔT degree C., the first substrate 30 thermally expands less and the second substrate 40 thermally expands more as shown in FIG. 8A. At this time, by a force acting on the thick portion 21 of the movable substrate 20 from above and from beneath, a moment in a counterclockwise direction occurs at the thick portion 21 on the right side in FIG. 8A and a moment in a clockwise direction occurs at the thick portion 21 on the left side in FIG. 8A.

An effect derived from the moments is transmitted to the diaphragm 23 and the diaphragm 23 is deformed toward the second substrate 40 as shown in the dotted line in FIG. 8A. Such a deformation results in the output error of the pressure sensor 10.

Figure 8B:
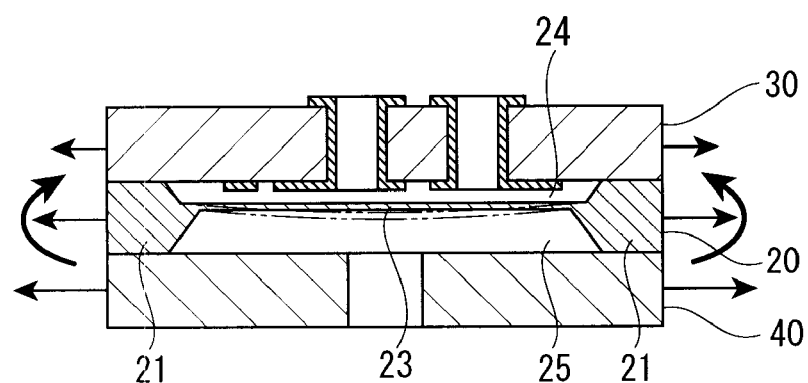
FIG. 8B is an illustration showing how the diaphragm is deformed by a moment.

Next, FIG. 8B is a cross section of a pressure sensor 10 in which the bottom surface of the shallow recess 24 is larger in area than that of the deep recess 25.

The first substrate 30 and the second substrate 40 are provided with the same characteristics as the above exemplary embodiment.

Even in the pressure sensor 10 according to the above arrangement, when a temperature changes by +ΔT degree C., the first substrate 30 thermally expands less and the second substrate 40 thermally expands more to generate a moment.

An effect derived from the moments is transmitted to the diaphragm 23 and the diaphragm 23 is deformed toward the second substrate 40 as shown in the dotted line in FIG. 8B. Such a deformation results in the output error of the pressure sensor 10.

Contrary to the above exemplary embodiment, when the coefficient of thermal expansion of the first substrate 30 is larger than that of the movable electrode 20 and that of the substrate 40 is smaller than that of the movable electrode 20, a moment is generated, thereby deforming the diaphragm 23 to cause an output error of the pressure sensor 10.

Figure 8C:
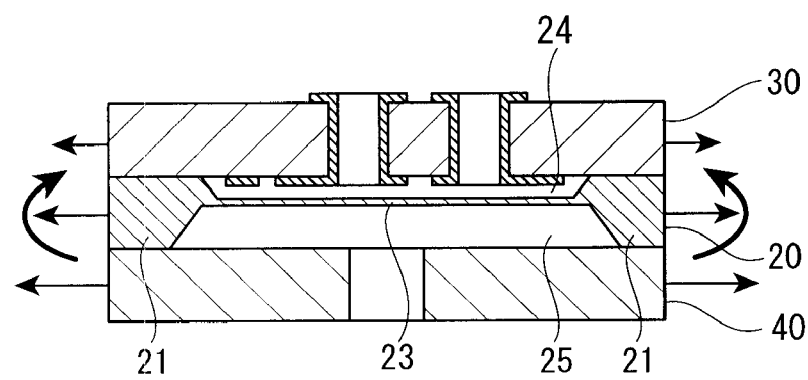
FIG. 8C is an illustration showing how the diaphragm is deformed by a moment.

FIG. 8C is a cross section of the pressure sensor 10 of the above exemplary embodiment.

It is considered that a moment is also generated at the thick portion 21 of the movable electrode 20 in the pressure sensor 10 of the above exemplary embodiment.

However, since the deep recess 25 has a larger bottom surface than that of the shallow recess 24, an effect derived from the moment of the thick portion 21 is unlikely to be transmitted to the diaphragm 23. Accordingly, the diaphragm 23 is unlikely to be deformed, so that an output error of the pressure sensor 10 can be avoided.

Contrary to the above exemplary embodiment, even when the coefficient of thermal expansion of the first substrate 30 is larger than that of the movable electrode 20 and the coefficient of thermal expansion of the substrate 40 is smaller than that of the movable electrode 20, an effect derived from a moment of the thick portion 21 is unlikely to be transmitted to the diaphragm 23, so that an output error of the pressure sensor 10 can be avoided.

According to the above exemplary embodiment, in the bonding step, the electrical potentials of the detection electrode 31 and the movable electrode 20 are equalized, so that electrostatic attractive force is not generated between the detection electrode 31 and movable electrode 20, which prevents the diaphragm 23 from being drawn toward the first substrate 30.

Consequently, the bend of the diaphragm 23 is prevented and stable anodic bonding can be carried out. Further, since the disturbance strain due to temperature is reduced, the diaphragm 23 can be thinned, so that a highly sensitive, small-sized and inexpensive pressure sensor 10 can be provided.

According to the above exemplary embodiment, the bonding electrodes 83 of the first substrate wafer 80 are provided along the cutting line 87, where a single bonding electrode 83 is shared between two sensor chips 61 next to each other. With this arrangement, the bonding process can be efficiently carried out with a small number of bonding electrodes 83.

[Modification]

Incidentally, the present invention is not limited to the embodiment described above, but includes other arrangements as long as an object of the present invention can be achieved. The following modification is also included in the scope of the present invention.

A material of respective members constituting the pressure sensor 10 is not limited to the exemplified materials in the above exemplary embodiment.

Alternatively, the material of the first substrate 30 and the material of the second substrate 40 used in the exemplary embodiment can be exchanged.

Even in this case, since the coefficient of thermal expansion of the movable electrode 20 is between the coefficients of thermal expansion of the first substrate 30 and the second substrate 40 in a temperature range where the physical quantity sensor 10 is used, forces acting on the movable electrode 20 derived from the first substrate 30 and the second substrate 40 to the movable electrode 20 are offset to avoid disturbance strain of the diaphragm 23 caused by changes in ambient temperature.

Figure 12:
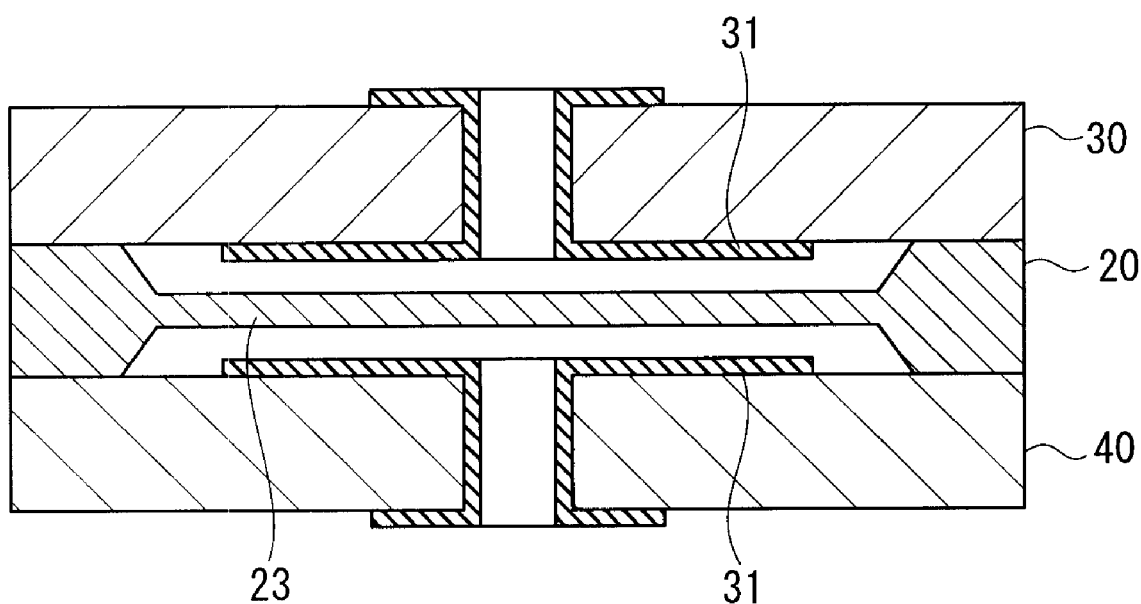
FIG. 12 is a cross section of a modification of the pressure sensor of the above exemplary embodiment.

Further, though the pressure sensor 10 provided with the detection electrode 31 only on the first substrate 30 is exemplified, the arrangement is not limited to this. For example, as shown in FIG. 12, the first substrate 30 and the second substrate 40 may be respectively provided with the detection electrode 31. Even in such a case, the same advantage as that of the above exemplary embodiment can be achieved.

EXAMPLE

Now, the present invention will be described in more detail below with examples and comparisons, the description of which by no means limits the scope of the present invention.

Figure 9:
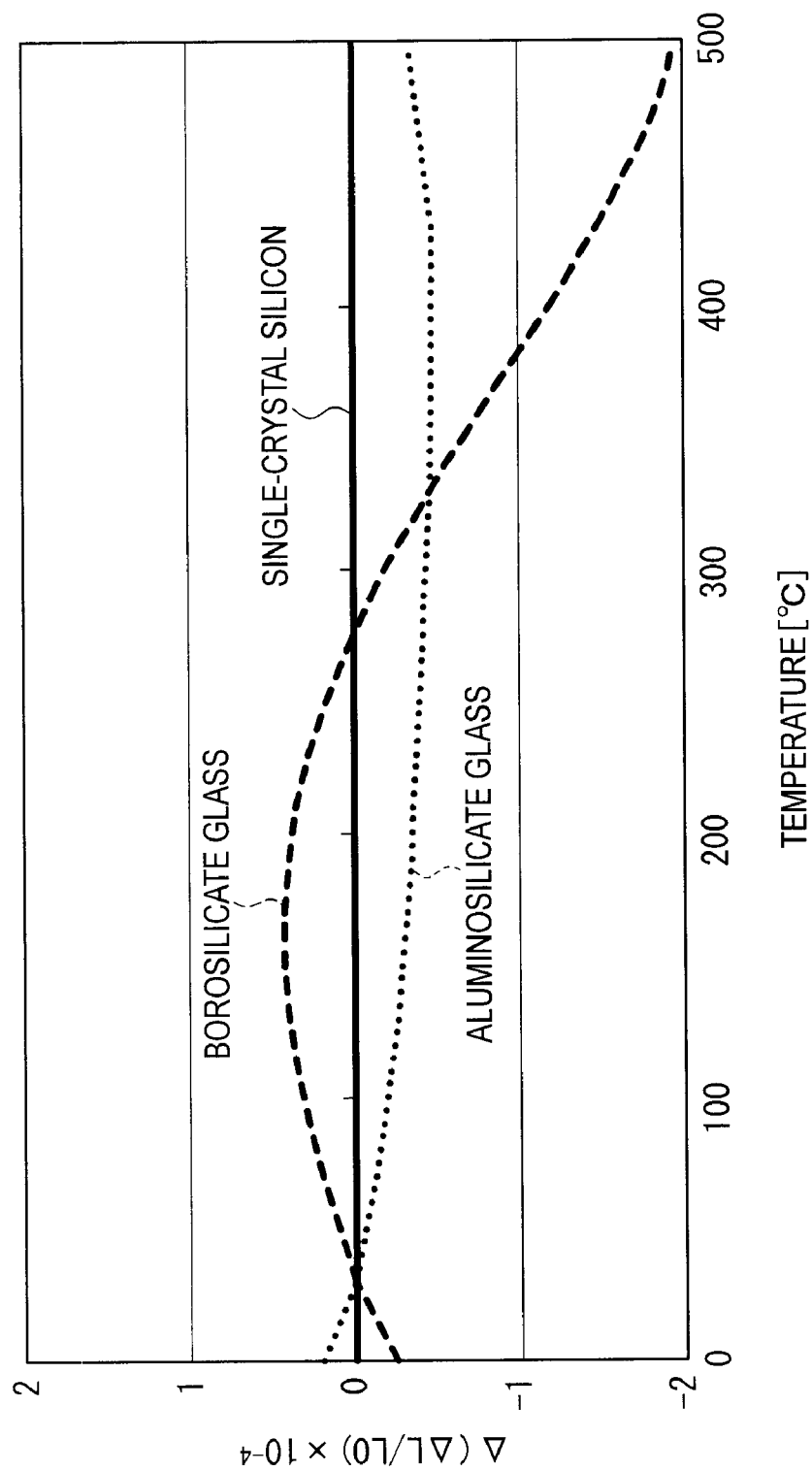
FIG. 9 is a graph showing an expansion ratio according to temperature of an aluminosilicate glass and a borosilicate glass used in the pressure sensor in an example of the above exemplary embodiment of the invention with reference to an expansion ratio according to temperature of single-crystal silicon.

FIG. 9 is a graph showing an expansion ratio according to temperature of an aluminosilicate glass and a borosilicate glass used in the example with reference to an expansion ratio of single-crystal silicon.

In Δ(ΔL/L0) in FIG. 9, L0 represents a total length of a sample (at the temperature of 20 degree C.) and ΔL represents an expansion amount according to temperature (with reference to the total length at the temperature of 20 degree C.), which is the longitudinal axis thus showing a difference from the expansion ratio of single-crystal silicon according to temperature.

In FIG. 9, with respect to straight lines connecting expansion ratios in the range between the room temperature and the bonding temperature (for example, 300 degree C. to 450 degree C.), an inclination of the straight line as for single-crystal silicon is 0 whereas inclinations of the straight lines as for the aluminosilicate glass and the borosilicate glass are negative (downwardly inclined).

In other words, the coefficients of thermal expansion of the aluminosilicate glass and the borosilicate glass are smaller than that of single-crystal silicon in the range between the room temperature and the bonding temperature.

Further, in the range of temperature in which the physical quantity sensor is used (for example, 0 degree C. to 100 degree C.), the coefficient of thermal expansion of the aluminosilicate glass is smaller (in FIG. 9, the inclination of the straight line connecting expansion ratios in the range from 0 degree C. to 100 degree C. is negative) and the coefficient of thermal expansion of the borosilicate glass is larger (in FIG. 9, the inclination of the line connecting expansion ratios in the range from 0 degree C. to 100 degree C. is positive) than that of single-crystal silicon (in FIG. 9, the inclination of the line connecting expansion ratios in the range from 0 degree C. to 100 degree C. is 0).

Example 1

An aluminosilicate glass ("SD2 (product name)" manufactured by HOYA CANDEO OPTRONICS CORPORATION) was used as the first substrate 30 and a borosilicate glass (PYREX. (trade mark) by Coming Inc.) was used as the second substrate 40. Single-crystal silicon was used as the movable electrode 20, in which the upper surface 23A of the diaphragm 23 was smaller than the lower surface 23B thereof so as to reduce the strain caused by changes in ambient temperature. According to the manufacturing method of the above exemplary embodiment, the pressure sensor 10 which was approximately 3.6 mm×3.6 mm in size and was provided with the diaphragm 23 of approximately 27 micrometer in thickness was manufactured.

Comparison 1

Except for using a borosilicate glass (PYREX (trade mark) by Coming. Inc.) as the first substrate 30 and the second substrate 40, a pressure sensor 10 was manufactured in the same manner as Example 1.

Incidentally, the coefficient of thermal expansion of the borosilicate glass (PYREX (trade mark) by Corning. Inc.) in the range between the bonding temperature and the room temperature was smaller than that of the movable electrode 20 and the coefficient of thermal expansion in the temperature range where the pressure sensor 10 was used was larger than that of the movable electrode 20.

Comparison 2

Except for using an aluminosilicate glass ("SD2 (product name)" manufactured by HOYA CANDEO OPTRONICS CORPORATION) as the first substrate 30 and the second substrate 40, a pressure sensor 10 was manufactured in the same manner as Example 1.

Incidentally, the coefficient of thermal expansion of the aluminosilicate glass in the range between the bonding temperature and the room temperature is smaller than the coefficient of thermal expansion of the movable electrode 20.

Evaluation of Pressure Sensor

The pressure sensors 10 manufactured in Example 1 and Comparisons 1 and 2 were evaluated with respect to zero point temperature characteristics and span temperature characteristics in the temperature range where the pressure sensors 10 were used.

The zero point (i.e. sensor output under no applied pressure) temperature characteristics were evaluated based on percentage (zero point change rate: %) showing a difference between the zero point of the pressure sensor 10 at 20 degree C. and the zero point of the pressure sensor 10 after changing the temperature relative to a span (a difference between sensor output applied with standard pressure (5 kPa) and a sensor output with no pressure) of the pressure sensor 10 at 20 degree C.

The span (i.e. a difference between sensor output applied with the standard pressure and a sensor output with no pressure) temperature characteristics were evaluated based on percentage (span change rate: %) showing a difference between the span of the pressure sensor 10 at 20 degree C. and the span of the pressure sensor 10 after changing the temperature relative to a span of the pressure sensor 10 at 20 degree C.

Figure 10:
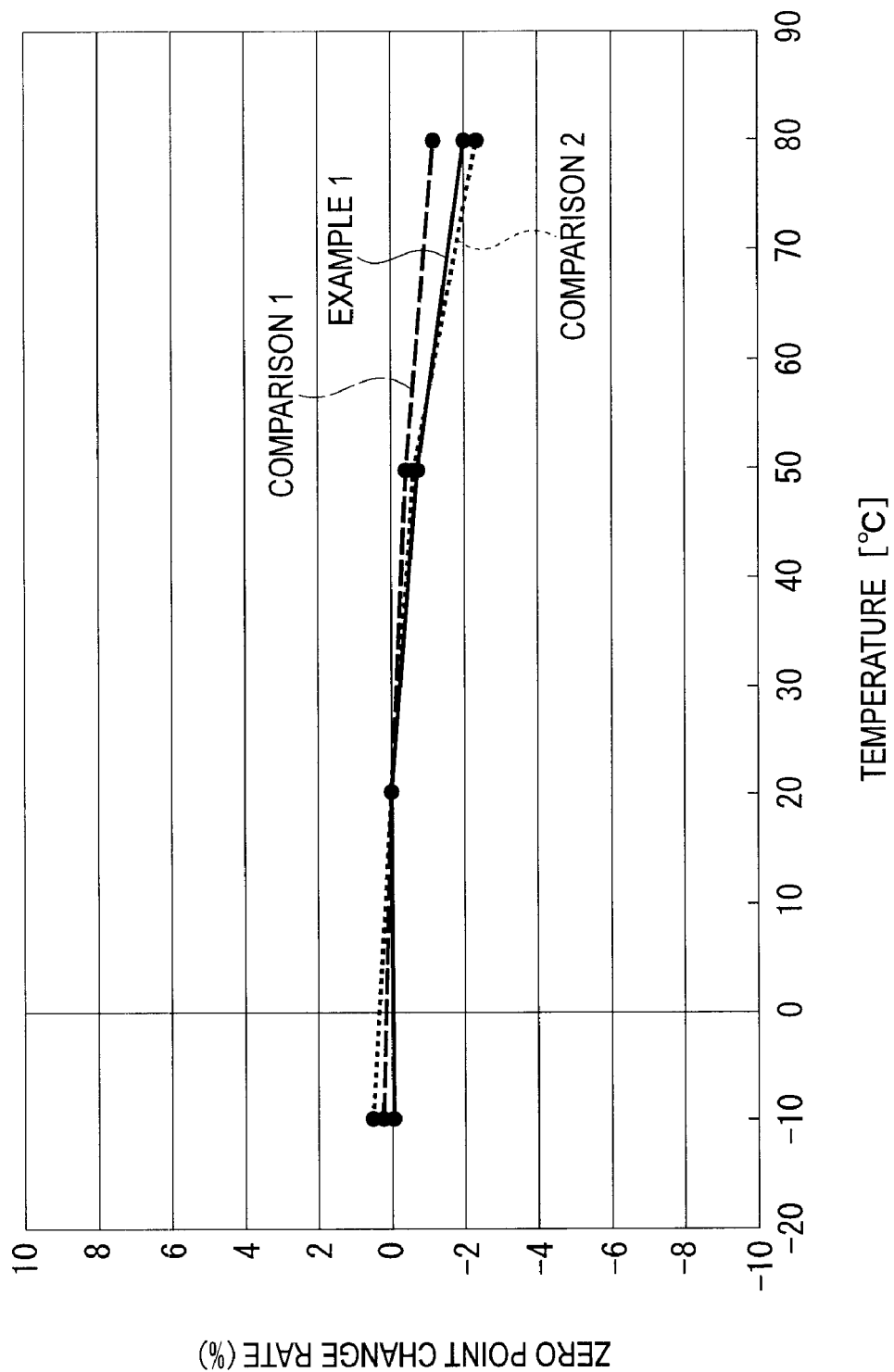
FIG. 10 is a graph showing zero point temperature characteristics of the pressure sensor in the example of the above exemplary embodiment.
Figure 11:
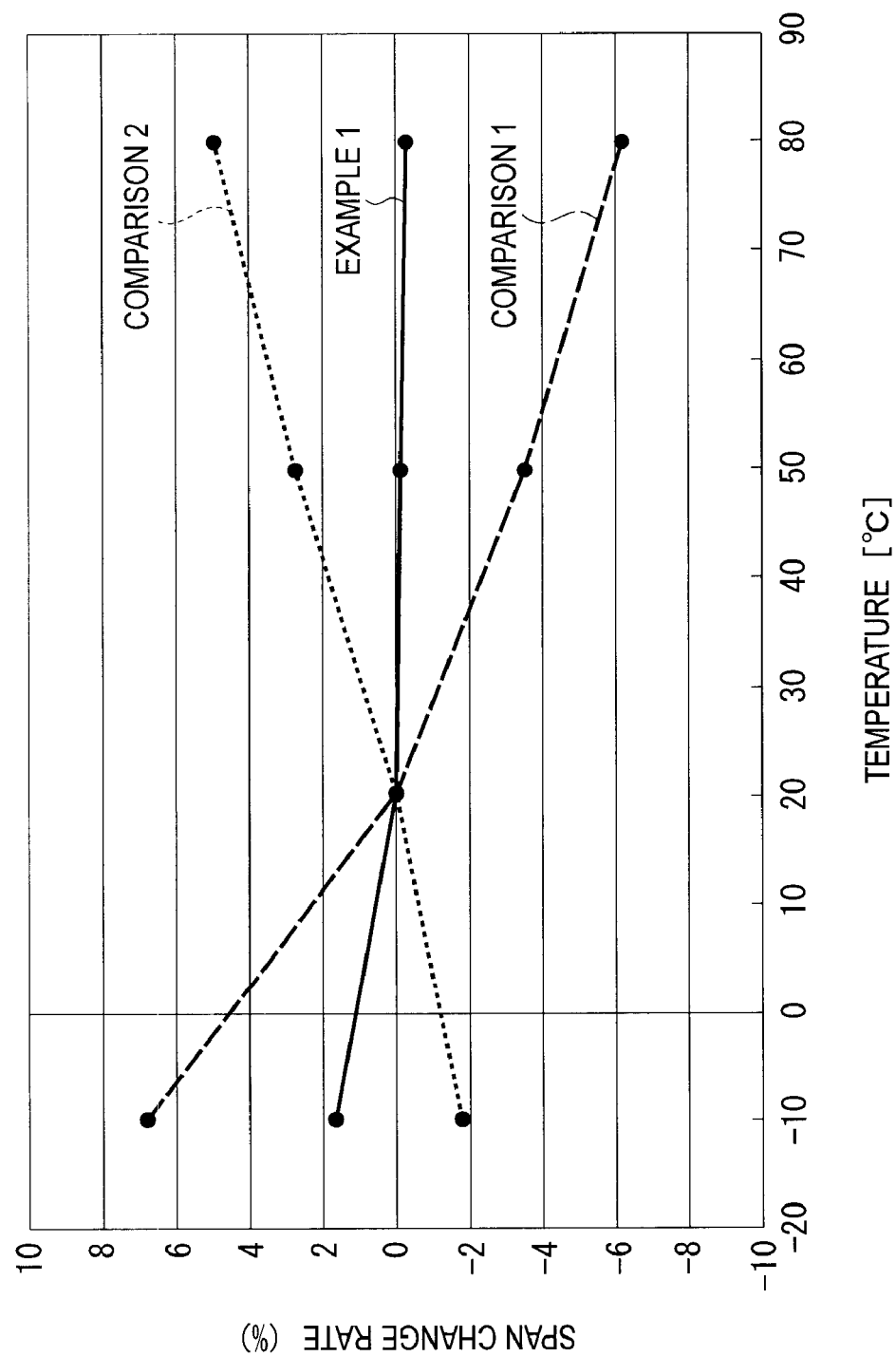
FIG. 11 is a graph showing span temperature characteristics of the pressure sensor in the example of the above exemplary embodiment.

FIG. 10 shows the zero point temperature characteristics and FIG. 11 shows the span temperature characteristics of the pressure sensor 10 of Example 1 and Comparisons 1 and 2.

FIG. 10 shows that the zero point change rates of all of the pressure sensors 10 of Example 2 and Comparisons 1 and 2 are low and the bend of the diaphragm 23 is prevented to reduce the disturbance strain caused by the temperature.

FIG. 11 shows that in the pressure sensor 10 of the Example 1, even when the ambient temperature changes, forces acting on the movable electrode 20 from the first substrate 30 and the second substrate 40 are offset to avoid the disturbance strain of the diaphragm 23.

The entire disclosure of Japanese Patent Application No. 2008-101393, filed Apr. 9, 2008 is expressly incorporated by reference herein.

What is claimed is:

1. A physical quantity sensor, comprising:
two substrates; and
a movable electrode that is disposed between the two substrates and is bonded to the two substrates, wherein
the movable electrode is provided with an elastically deformable diaphragm,
at least one of the two substrates is an electrode substrate having one or more detection electrodes on a surface opposite to the diaphragm to detect a change in capacitance between the diaphragm and the detection electrode, and wherein,
in a range between a room temperature and a bonding temperature when the two substrates are bonded to the movable electrode, coefficients of thermal expansion of the two substrates are smaller than a coefficient of thermal expansion of the movable electrode, and, the two substrates are a first substrate and a second substrate having different coefficients of thermal expansion with each other in a temperature range where the physical quantity sensor is used, the coefficient of thermal expansion of the movable electrode being between the coefficients of thermal expansion of the first substrate and the second substrate in a temperature range where the physical quantity sensor is used.

2. The physical quantity sensor according to claim 1, wherein the movable electrode is provided with two recesses, each of the two recesses being provided on surfaces opposing the two substrates, and the diaphragm is a thin portion located between bottom surfaces of the two recesses, wherein one of the two recesses is deeper than the other of the two recesses, and the bottom surface of the one of the two recesses is larger in area than that of the other of the two recesses.

3. A method for manufacturing the physical quantity sensor according to claim 2, further comprising:

anodically bonding the electrode substrates and the movable electrode while the electrical potentials of the detection electrode formed on the electrode substrates and the movable electrode are equalized.

4. The method for manufacturing the physical quantity sensor according to claim 3, wherein the bonding comprising laminating a substrate wafer in which a plurality of the substrates are integrally formed, and a diaphragm wafer in which a plurality of the movable substrates are integrally formed;

applying voltage to a bonding electrode that is formed on the substrate wafer in a predetermined pattern to anodically bond the substrate wafer and the diaphragm wafer with each other; and cutting the substrate wafer and the diaphragm wafer anodically bonded in the voltage-applying along a cutting line, wherein at least a part of the bonding electrode is provided along the cutting line.

5. A method for manufacturing the physical quantity sensor according to claim 1, comprising:

anodically bonding the electrode substrate and the movable electrode while the electrical potentials of the detection electrode formed on the electrode substrate and the movable electrode are equalized.

6. The method for manufacturing the physical quantity sensor according to claim 5, wherein the bonding comprising:

laminating a substrate wafer in which a plurality of the substrates are integrally formed, and a diaphragm wafer in which a plurality of the movable electrodes are integrally formed;

applying voltage to a bonding electrode that is formed on the substrate wafer in a predetermined pattern to anodically bond the substrate wafer and the diaphragm wafer with each other; and cutting the substrate wafer and the diaphragm wafer anodically bonded in the voltage-applying along a cutting line, wherein at least a part of the bonding electrode is provided along the cutting line.

* * * * *